(12) United States Patent
Benton et al.

(10) Patent No.: US 11,878,270 B2
(45) Date of Patent: Jan. 23, 2024

(54) OSMOSIS MODULES HAVING RECIRCULATION LOOPS

(71) Applicant: Porifera, Inc., San Leandro, CA (US)

(72) Inventors: Charles Benton, Berkeley, CA (US); Carl Lundin, Denver, CO (US)

(73) Assignee: Porifera, Inc., San Leandro, CA (US)

( * ) Notice: Subject to any disclaimer, the term of this patent is extended or adjusted under 35 U.S.C. 154(b) by 82 days.

(21) Appl. No.: 17/261,753

(22) PCT Filed: Jul. 19, 2019

(86) PCT No.: PCT/US2019/042692
§ 371 (c)(1),
(2) Date: Jan. 20, 2021

(87) PCT Pub. No.: WO2020/018962
PCT Pub. Date: Jan. 23, 2020

(65) Prior Publication Data
US 2021/0268437 A1  Sep. 2, 2021

Related U.S. Application Data

(60) Provisional application No. 62/701,517, filed on Jul. 20, 2018.

(51) Int. Cl.
*B01D 61/00* (2006.01)
*C02F 1/44* (2023.01)

(52) U.S. Cl.
CPC ........ *B01D 61/002* (2013.01); *B01D 2311/25* (2013.01); *B01D 2311/2653* (2013.01);
(Continued)

(58) Field of Classification Search
CPC .............. B01D 61/002; B01D 2311/25; B01D 2311/2653; B01D 2313/243;
(Continued)

(56) References Cited

U.S. PATENT DOCUMENTS

| 2,116,920 A | 5/1938 | Leonard |
| 3,672,509 A | 6/1972 | Buchmann et al. |

(Continued)

FOREIGN PATENT DOCUMENTS

| CN | 1845781 A | 10/2006 |
| CN | 105073229 A | 11/2015 |

(Continued)

OTHER PUBLICATIONS

"Translation for Office Action for CN 201980053310.0, dated May 5, 2022".

(Continued)

*Primary Examiner* — Pranav N Patel
(74) *Attorney, Agent, or Firm* — Dorsey & Whitney LLP

(57) ABSTRACT

The present disclosure describes methods and systems for separating a fluid. The methods and systems include a plurality of osmosis modules operably coupled together. At least some of the plurality of osmosis modules include an osmosis membrane, a feed side on a first side of the osmosis membrane; a draw side on a second side of the osmosis membrane; a feed inlet operably coupled to the feed side; a draw inlet operably coupled to the draw side; a feed outlet operably coupled to the feed side; a draw outlet operably coupled to the draw side. The at least some of the plurality of osmosis units further including a feed recirculation loop operably coupled to the feed inlet, the feed outlet, and a feed inlet of a downstream osmosis module; and a draw recirculation loop operably coupled to the draw inlet, the draw outlet, and a draw inlet of a downstream osmosis module.

10 Claims, 4 Drawing Sheets

(52) U.S. Cl.
CPC .. *B01D 2313/243* (2013.01); *B01D 2317/022* (2013.01); *B01D 2317/06* (2013.01)

(58) Field of Classification Search
CPC .......... B01D 2317/022; B01D 2317/06; B01D 2311/14; B01D 2311/246; B01D 2317/02; B01D 19/0031; C02F 1/445
See application file for complete search history.

(56) References Cited

U.S. PATENT DOCUMENTS

| | | | |
|---|---|---|---|
| 5,281,430 | A | 1/1994 | Herron et al. |
| 9,427,705 | B1 | 8/2016 | Abusharkh |
| 9,861,937 | B2 | 1/2018 | Benton et al. |
| 2005/0045029 | A1 | 3/2005 | Colling et al. |
| 2012/0273417 | A1 | 11/2012 | Mcginnis et al. |
| 2014/0224716 | A1 | 8/2014 | Hancock et al. |
| 2017/0028347 | A1 | 2/2017 | Wright et al. |
| 2017/0028348 | A1 | 2/2017 | Hancock et al. |

FOREIGN PATENT DOCUMENTS

| | | |
|---|---|---|
| CN | 107405572 A | 11/2017 |
| CN | 206897183 U | 1/2018 |
| CN | 109692571 A | 4/2019 |
| EP | 0210837 A2 | 2/1987 |
| WO | 2016094835 A1 | 6/2016 |
| WO | 2016210337 A2 | 12/2016 |
| WO | 2017040696 A1 | 3/2017 |

OTHER PUBLICATIONS

"Extended European Search Report for EP Appl. No. 19838142.8, dated Mar. 16, 2022".
International Search Report and Written Opinion dated Oct. 16, 2019 for PCT Application No. PCT/US2019/042692, 14 pages.
Alfa Laval, Alfa Laval Corporate AB, "Membrane Filtration", Company Brochure, 1-16 (2003), 2003, 1-16.
"Examination Report for EP Patent Appl. No. 19838142.8; Communication Pursuant to Article 94(3) EPC, dated Mar. 7, 2023".
Telin, Scott , "Quick and Dirty Guide to Air Release Valves", Sep. 29, 2015 (Sep. 29, 2015), pp. 1-4, XP093028179, retried from the internet: https://web.archive.org/web/20150929004814/https://blog.craneengineering.net/quick-and-dirty-guide-to-air-release-valves [retried on Mar. 1, 2023].
"Office Action and Translation for CN 201980053310.0, dated Oct. 31, 2022".
"English Translation of Rejection Decision dated Mar. 29, 2023".

OSMOSIS MODULES HAVING RECIRCULATION LOOPS

CROSS-REFERENCE TO RELATED APPLICATION

This application is a 35 U.S.C. § 371 National Stage Application of PCT Application No. PCT/US2019/042692 filed Jul. 19, 2019, which claims the benefit of U.S. Provisional Application 62/701,517 filed Jul. 20, 2018, the entire contents of which are hereby incorporated by reference, in their entirety, for any purposes.

BACKGROUND

Osmotically driven membrane systems are used to treat solutions with suspended solids, dissolved solids, other solutes that are or are not desired in a final product. The feed solution is introduced into a feed side of an osmosis element and the draw solution is introduced into a draw side of an osmosis element, where the feed and draw channels are separated by the osmosis membrane. Components of the feed solution are drawn to the draw side via osmotic pressure and removed in the draw solution. Osmotically driven membrane systems can suffer from fouling, clogging, and inefficiencies caused by build-up of materials on the membrane surface.

SUMMARY

Examples described herein relate to systems, apparatuses, and methods of separating components from solutions using an osmosis module having feed recirculation and draw recirculation loops.

In at least one embodiment, a system for separating a fluid is disclosed. The system includes a plurality of osmosis modules operably coupled together. At least some of the plurality of osmosis modules include an osmosis membrane, a feed side on a first side of the osmosis membrane; a draw side on a second side of the osmosis membrane; a feed inlet operably coupled to the feed side; a draw inlet operably coupled to the draw side; a feed outlet operably coupled to the feed side; a draw outlet operably coupled to the draw side. The at least some of the plurality of osmosis units further including a feed recirculation loop operably coupled to the feed inlet, the feed outlet, and a feed inlet of a downstream osmosis module; and a draw recirculation loop operably coupled to the draw inlet, the draw outlet, and a draw inlet of a downstream osmosis module.

In at least one embodiment, a method for separating components form a solution is disclosed. The method includes passing a feed stream to a plurality of membrane modules in a first direction. The method includes circulating a draw stream to the plurality of membrane modules in a second direction opposite the first direction. The method includes running the feed stream and the draw stream through each of the plurality of membrane modules in a co-current flow, wherein at one or more membrane modules of the plurality of membrane modules the feed stream is circulated through a membrane module in a feed recirculation loop to form a recirculated feed stream corresponding to the membrane module and the draw stream is circulated through the membrane module in a draw recirculation loop to form a recirculated draw stream corresponding to the membrane module. The method includes directing a portion of the recirculated feed stream in each feed recirculation loop to: a subsequent membrane module in a subsequent feed recirculation loop of the plurality of membrane modules or a concentrated feed stream outlet operably coupled to the plurality of membrane modules; and the membrane module of the plurality of membrane modules in the feed recirculation loop. The method includes moving a portion of the recirculated draw stream in each draw recirculation loop to: a previous membrane module in a previous draw recirculation loop of the plurality of membrane modules or a diluted draw stream outlet operably coupled to the plurality of membrane modules; and the membrane module of the plurality of membrane modules in the draw recirculation loop In at least one embodiment, a system for separating fluids is disclosed. The system includes a first membrane stage having a first membrane module including a first feed side, a first draw side, and a first forward osmosis membrane separating the first feed side from the first draw side. The first membrane stage includes a first feed recirculation loop fluidly coupling an input of the first feed side with an output of the first feed side and a first draw recirculation loop fluidly coupling an input of the first draw side with an output of the first draw side. The system includes a second membrane stage having a second membrane module including a second feed side, a second draw side, and a second forward osmosis membrane separating the second feed side from the second draw side. The second membrane module includes a second feed recirculation loop fluidly coupling an input of the second feed side with an output of the second feed side and a second draw recirculation loop fluidly coupling an input of the second draw side with an output of the second draw side. The system includes a first fluid connection between the first feed recirculation loop and the second feed recirculation loop, wherein at least a portion of a first recirculated feed stream is directed to the second feed recirculation loop from the first feed recirculation loop. The system includes a second fluid connection between the first draw recirculation loop and the second draw recirculation loop, wherein at least a portion of a second recirculated draw stream is directed to the first draw recirculation loop from the second draw recirculation loop.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Figure 1:
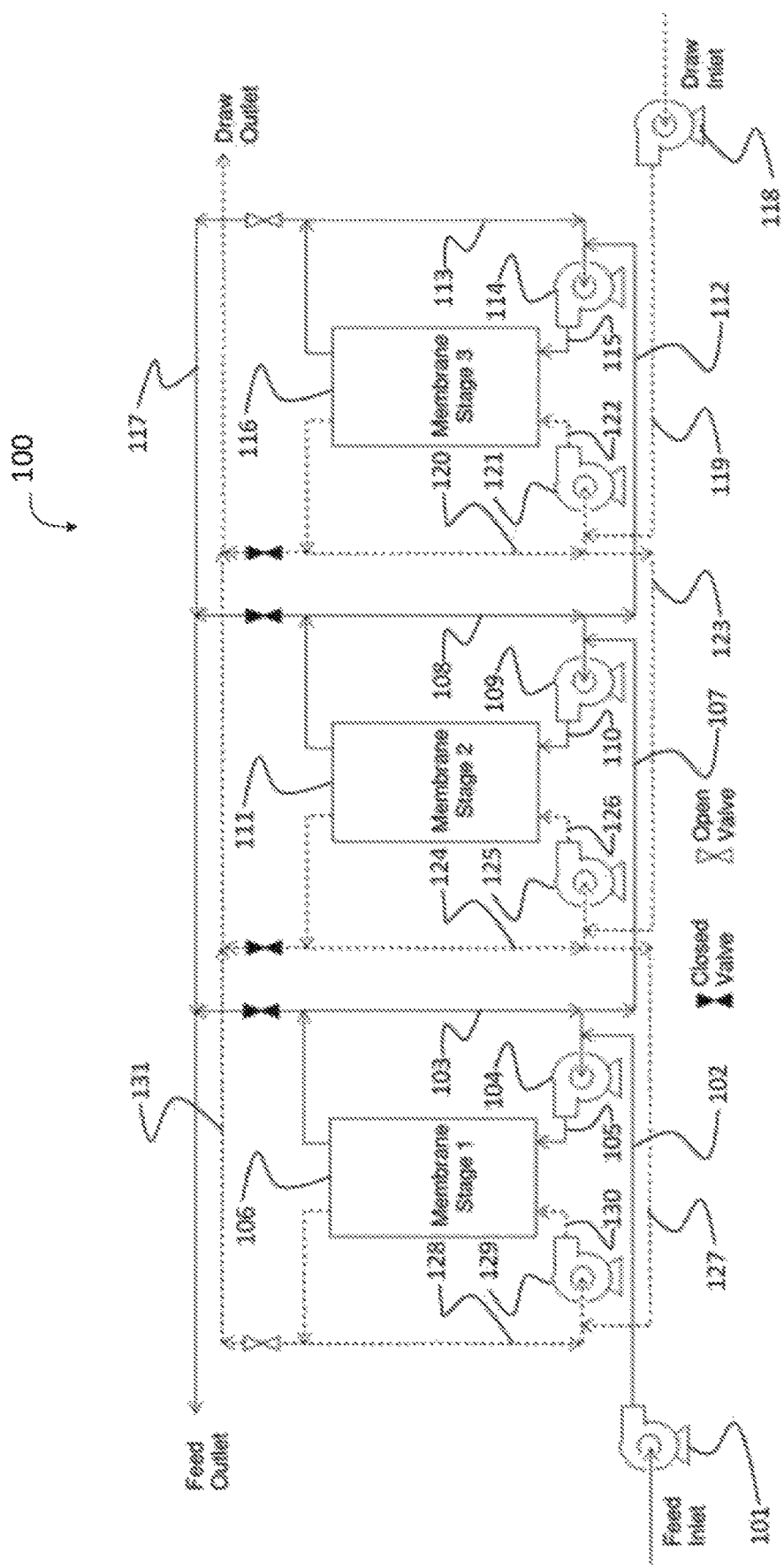
FIG. 1 is a schematic of a system 100 for separating components of a solution, according to an embodiment.

Examples described herein relate to fluid separation processes and systems utilizing recirculation loops on both the feed side and the draw side of the systems. The fluid separation systems include a plurality of osmotically driven membrane modules (e.g., forward osmosis module) or units each having a forward osmosis membrane separating a feed stream from a draw stream. The osmotically driven membrane modules are staged or arranged in series with fluid connections (e.g., plumbing) between each osmotically driven membrane module. An outlet of a feed stream from each stage is directed to an inlet of a feed stream for an immediately subsequent stage until a final stage is reached where the outlet of the final feed stream (e.g., product) is directed out of the system. An outlet of a draw stream from each stage, beginning with the final stage, is directed to an inlet of a draw stream for the previous stage until the first stage is reached where the final draw outlet is directed out of the system. Each of the feed and draw streams are arranged in recirculation loops on each stage prior to being directed to another stage. Valves are located on each recirculation loop which allows selective control of the feed and draw streams in the respective recirculation loops, filling of the loops with fluid by pushing gas out of the loops, removing fluids from the loops by pushing gas into the loops from the highpoint, venting gas out of the loops during operation, and providing a direct connection to outlet manifolds during cleaning in place.

Osmotically driven membrane processes (e.g., forward osmosis) are capable of treating solutions with suspended solids, dissolved solids, other solutes, or with viscosities that increase as they are concentrated, in an energy efficient manner, by using a chemical energy gradient between two solutions to drive water flux across a membrane. Osmotic treatment processes utilize a draw solution with a greater osmotic potential (or osmotic pressure) relative to the feed solution to provide a driving force for water transport across a membrane. As relatively pure water flows across the membrane, it dilutes the draw solution. The feed solution is introduced into a feed side or channel of an (forward) osmosis element and the draw solution is introduced into a draw side or channel of an (forward) osmosis element, where the feed and draw channels are separated by the (forward) osmosis membrane. The feed solution is circulated through the system at a selected flow rate and/or hydrostatic pressure as a feed stream and the draw solution is circulated through the system at a selected flow rate and/or hydrostatic pressure as a draw stream.

The overall rate of production in an osmotic system is dictated by the flow of permeate (e.g., water) across the osmotic membrane. This flow is determined in large part by membrane properties and the differential of the draw solution osmotic pressure touching the membrane to the feed solution osmotic pressure touching the membrane. During use, fluid boundary layers on the membrane form which decrease the effective osmotic pressure differential relative to the bulk solutions. Controlling the flow rate and hydrostatic pressure of the feed and draw streams can reduce the fluid boundary layers and increase separation efficiency of the membrane module systems and processes compared to conventional systems.

For some feed solutions containing or forming suspended solids, fouling (or build-up of solids) in the feed channel can increase hydrostatic pressure drop, decrease flow rate through the feed channel, and increase the thickness of the membrane boundary layers. This accumulation of solids in the membrane element also reduces the concentration of solids leaving the element which in some cases is the desired product. Controlling the flow rate and hydrostatic pressure of the feed and draw streams can reduce the accumulation of solids and increase separation efficiency of the membrane module systems and processes compared to conventional systems.

For some feed solutions, the viscosity increases as a feed stream is concentrated, due to an increase in suspended solids or dissolved solids or both, may cause an increase in head loss along the feed path, creating difficult to predict head losses in a membrane system from the feed inlet to the feed outlet. The systems and processes disclosed herein allow selective control of flow rates and hydrostatic pressure in the feed and draw streams through each stage of the system reduce or eliminate boundary layers, accumulation of solids in flow channels, and reduce head loss along flow paths of the respective membrane modules.

Systems for separating fluids include a plurality of osmosis modules (e.g., membrane modules or stages) operably coupled together. At least some of the plurality of osmosis modules include an osmosis membrane (e.g., forward osmosis membrane), a feed side on a first side of the osmosis membrane, a draw side on a second side of the osmosis membrane, a feed inlet operably coupled to the feed side, a draw inlet operably coupled to the draw side, a feed outlet operably coupled to the feed side, and a draw outlet operably coupled to the draw side. The system includes a feed recirculation loop operably coupled to the feed inlet, the feed outlet, and a feed inlet of a downstream osmosis module. The system includes a draw recirculation loop operably coupled to the draw inlet, the draw outlet, and a draw inlet of a downstream osmosis module. The bulk feed stream and bulk draw stream are introduced at opposing sides of the system 100 and are circulated therethrough in a bulk counter-current manner, but in co-current flows through each individual osmosis module of the system 100. Put another way, the bulk feed stream flows from a first osmosis module to a last osmosis module and the bulk draw stream flows from the last osmosis module to the first osmosis module. Accordingly, the downstream direction of the feed stream, through the system as a whole, is in the opposite direction of the downstream direction of the draw stream. The respective streams are directed through recirculation loops at each osmosis module to control flow rate, solute concentration(s), and hydrostatic pressure.

A feed recirculation pump in the feed recirculation loop and a draw recirculation pump in the draw recirculation loop of each osmosis module of the plurality of osmosis modules controls the flow rate, hydrostatic pressure, and composition of the solution in the respective recirculation loops. The feed recirculation pump is operably coupled to a feed stream source (e.g., upstream feed recirculation loop or bulk feed stream) and the draw recirculation pump is operably coupled to a draw stream source (e.g., upstream draw recirculation loop or bulk draw stream). For example, the feed stream source may include a previous osmosis module feed recirculation loop or a bulk feed inlet of the osmosis system, and the draw stream source may include a previous osmosis module draw recirculation loop or a bulk draw inlet of the osmosis system. One or more valves operably coupled to the feed recirculation loop(s) and a feed outlet of the osmosis system above the plurality of osmosis modules, and one or more valves operably coupled to the draw recirculation loop(s) and a draw outlet of the osmosis system above the plurality of osmosis modules may be used to control the inputs (bulk feed stream and bulk draw stream) and outputs (concentrated feed stream and diluted draw stream) of the system, fill the respective recirculation loops with fluid or gas, or vent gas from the respective recirculation loop.

Embodiments of systems for separating fluids and the components thereof are described in more detail below.

FIG. 1 is a schematic of a system 100 for separating components of a solution, according to an embodiment. The system 100 includes a plurality of membrane stages (e.g., forward osmosis stages or modules) plumbed in series. Each membrane stage may include a forward osmosis module having a draw side, a feed side, and a forward osmosis membrane separating the feed side from the draw side. As shown, the plurality of membrane stages may include a first membrane stage, a second membrane stage, and a third membrane stage. The feed sides and draw sides of the membrane stages are fluidly coupled (e.g., plumbed) together in a series of recirculation loops wherein each membrane stage includes a draw recirculation loop and a feed recirculation loop. Generally, the recirculation loops connect the outlet of a respective side of a membrane module with the inlet of the respective side to recirculate at least some of the output fluid through the membrane module. The recirculation loops are connected to a stream source and a subsequent stream (e.g., serve as a stream source for a downstream membrane module and recirculation loop). For example, the recirculation loops are fluidly coupled or connected to a fluid supply (e.g., fluid stream from a previous membrane module or recirculation loop) and a fluid output (e.g., fluid stream of a subsequent membrane module or system output).

The feed stream is provided to the first membrane stage 106, such as pumped with flow controlled pump 101 (e.g., feed inlet pump) to form a bulk feed stream 102 at a feed bulk flow rate. Bulk feed stream 102 is fed into the first stage feed recirculation loop and mixed with a partially concentrated and recirculated feed stream 103 to form a combined feed stream 105, such as prior to being introduced into the first membrane stage 106. The bulk feed stream 102 and the recirculated feed stream 103 may be combined prior to entering a hydrostatic pressure controlled pump 104. The combined feed stream 105 may be pumped with the hydrostatic pressure controlled pump 104 (e.g., recirculation pump) at a selected hydrostatic pressure and flow rate. For example the combined feed stream 105 may be pumped at a flow rate to achieve a fluid speed on the surface of the membrane in the first membrane stage of 5 cm/sec to 15 cm/sec, and at a pressure of between 13.5 kPa and 345 kPa (e.g., 2 psi to 50 psi). Such a flow rate may be at least about 18 liters/minute (l/min), such as about 19 l/min to about 57 l/min. The combined feed stream 105 then enters the first membrane stage 106 (e.g., forward osmosis membrane module). The feed stream in the first membrane stage 106 is discharged from the first membrane stage 106, forming recirculated feed stream 103. The membrane area of the first membrane stage 106 may be tuned to provide the largest amount of the total permeate removed in the system 100 for a single stage. A portion of the recirculated feed stream 103 is forced out of the first feed recirculation loop to form the second feed stream 107. At least a portion of the recirculated feed stream 103 may be directed back to form the combined feed stream 105. A valve may be disposed between the first recirculation loop and the second recirculation loop to selectively control the amount of recirculated feed stream 103 that is directed to the second membrane stage 111 (e.g., to the second stage feed recirculation loop) and back into the first membrane stage 106 for combination with the bulk feed stream 102. The feed recirculation loop refers to the combined feed stream, the hydrostatic pressure controlled pump, the feed side of the membrane stage, the recirculated feed stream, and the structures (e.g., plumbing and valves) that contain the same.

The second feed stream 107 is fed into the second stage feed recirculation loop for separation in the second membrane stage 111. The second feed stream 107 is mixed with a partially concentrated and (second) recirculated feed stream 108 in the second feed recirculation loop to form the second combined feed stream 110 prior to introduction into the second membrane stage 111. The second combined feed stream 110 is pumped with a hydrostatic pressure controlled pump 109 (e.g., recirculation pump) at a selected hydrostatic pressure and flow rate, such as at a flow rate (e.g., about 19 l/min to about 57 l/m) to achieve a fluid speed on the surface of the membrane in the second membrane stage of 5 cm/sec to 15 cm/sec, and at a pressure of between 13.5 kPa and 345 kPa. The second combined feed stream 110 then enters the second membrane stage 111. The feed stream loses a second amount of the total permeate removed in the system (e.g., less than is removed in the first membrane stage 106), and is discharged from second membrane stage 111, forming recirculated feed stream 108. A portion of recirculated feed stream 108 is forced out of the second stage feed recirculation loop forming the third feed stream 112. At least a portion of the recirculated feed stream 108 may be directed back (to the second membrane stage 111) to form the second combined feed stream 110.

The third feed stream 112 is directed to the third membrane stage 116. The third feed stream 112 is fed into the third stage feed recirculation loop and mixed with a fully concentrated and (third) recirculated feed stream 113 to form the combined feed stream 115. The third feed stream 112 and recirculated feed stream 113 are combined prior to the third membrane stage 116, such as prior to the hydrostatic pressure controlled pump 114 (e.g., recirculation pump). The recirculated feed stream 113 is pumped with the hydrostatic pressure controlled pump 114 forming a combined feed stream 115 having a selected hydrostatic pressure and flow rate, such as at a flow rate (e.g., about 19 l/min to about 57 l/m) to achieve a fluid speed on the surface of the membrane in the third membrane stage of 5 cm/sec to 15 cm/sec, and at a pressure of between 13.5 kPa and 345 kPa. The combined feed stream 115 then enters the third membrane stage 116. The combined feed stream 115 loses the least amount of the permeate removed, at a single stage, in the total system, and is discharged from the third membrane stage 116 as recirculated feed stream 113. The recirculated feed stream 113 is the most concentrated feed stream in the system 100. A portion of recirculated feed stream 113 is forced out of the third stage feed recirculation loop forming the concentrated feed discharge stream 117 of the system 100. At least a portion of the recirculated feed stream 113 may be directed back to form the combined feed stream 110.

Alternatively, the concentrated feed discharge stream 117 may be removed from the system 100, such as pumped with a flow controlled pump (e.g., concentrate discharge pump). This would negate the need for flow control on the feed inlet pump 101, as flow controlling the feed inlet pump would over constrain the system 100. This is particularly useful with feed concentration factors greater than three times and bulk feed concentration.

The pumps in the system 100 may provide selected hydrostatic pressures and flow rates at various points in the system 100. For example, the hydrostatic pressure in the feed side of the membrane stages may be higher than the hydrostatic pressure in the draw side of the membrane stages, for example 13.5 kPa to 138 kPa higher, such as to prevent draw solution from entering the feed stream (e.g., through leaks in the membrane(s)).

The feed stream is circulated through the system 100 in a first direction through feed recirculation loops corresponding to each of the membrane modules (e.g., membrane stages). Similarly, a draw stream (e.g., draw solution having a greater solute(s) concentration than the feed stream) is circulated through the system 100, but in the opposite direction of the feed stream. The draw stream is cycled through individual membrane stages in the same direction (e.g., co-current flow) as the feed stream in draw recirculation loops. Each draw recirculation loop feeds the draw stream to a previous stage. For example, the third stage draw recirculation loop feeds the draw stream produced in the third membrane stage being directed to the second membrane stage via a second draw recirculation loop. Put another way, the draw stream is introduced into the system at the last (e.g., third) membrane stage and cycled through the system to the first membrane stage where the draw stream is removed from the system 100 as a diluted draw discharge stream 131.

A draw solution is introduced into the system via the flow controlled pump 118. The draw solution is pumped with flow controlled pump 118 to form a bulk draw stream 119 having a selected flow rate and hydrostatic pressure. Bulk draw stream 119 is fed into the third stage draw recirculation loop and mixed with a partially diluted and (first) recirculated draw stream 120 to form combined draw stream 122. The bulk draw stream 119 and recirculated draw stream 120 are combined prior to introduction into the third membrane stage 116. Combined draw stream 122 may be pumped with the hydrostatic pressure controlled pump 121 (e.g., recirculation pump) into the third membrane stage 116 at a selected hydrostatic pressure and flow rate. The combined draw stream 122 then enters the third membrane stage 116 where solutes are drawn across the membrane from the feed stream 115 into the combined draw stream 122. The combined draw stream 122 absorbs a portion of the total permeate (e.g., smallest single portion) from the feed stream by the system 100. The combined draw stream is discharged from the third membrane stage 116, forming recirculated draw stream 120. The recirculated draw stream 120 may be more dilute (e.g., have a higher concentration of permeate(s)) than the combined draw stream 122. A portion of recirculated draw stream 120 may be forced out of the third stage draw recirculation loop, such as via a valve to form second draw stream 123. At least a portion of the recirculated draw stream 120 may be directed back to the third membrane stage 116. For example, the recirculated draw stream 120 and the bulk draw stream 119 may be combined prior to the hydrostatic pressure controlled pump 121. A valve may be positioned between the recirculated draw stream 120 and the pump 121 to selectively control an amount of the recirculated draw stream 120 that is passed to the pump 121 or to the second (prior) membrane stage 111. The draw recirculation loop refers to the combined draw stream, the hydrostatic pressure controlled pump, the draw side of the membrane stage, the recirculated draw stream, and the structures (e.g., plumbing and valves) that contain the same.

Second draw stream 123 is fed into the second stage draw recirculation loop and mixed with a partially diluted and recirculated draw stream 124 to form (second) combined draw stream 126. Second draw stream 123 is combined with the recirculated draw stream 124 prior to introduction into the second membrane stage 111 or the hydrostatic pressure controlled pump 125 (e.g., recirculation pump). The hydrostatic pressure controlled pump 125 pressurizes and supplies the combined draw stream 126 at a selected pressure and flow rate. The combined draw stream 126 then enters the second membrane stage 111 where permeate(s) are drawn from the second combined feed stream 110 into the combined draw stream 126. The combined draw stream 126 absorbs a portion of the total permeate in the system 100. The combined draw stream having the absorbed permeate(s) is discharged from second membrane stage 111 to form the second recirculated draw stream 124. The second diluted draw stream 124 is more diluted than the combined draw stream 126. At least a portion of the second recirculated draw stream 124 may be forced out of the second stage recirculation loop forming to form the third draw stream 127. At least a portion of the recirculated draw stream 124 may be directed back to the second membrane stage 111. For example, the recirculated draw stream 124 and the draw stream 123 may be combined prior to the hydrostatic pressure controlled pump 125. A valve may be positioned between the recirculated draw stream 124 and the pump 125 to selectively control an amount of the recirculated draw stream 124 that is passed to the pump 125 or to the first (prior) membrane stage 106.

The third draw stream 127 is fed into the first stage draw recirculation loop and mixed with a partially diluted and recirculated draw stream 128 to form (first) combined draw stream 130. Third draw stream 127 is combined with the recirculated draw stream 128 prior to introduction into the second membrane stage 111. The combined draw stream 130 is circulated through the hydrostatic pressure controlled pump 125 (e.g., recirculation pump). The hydrostatic pressure controlled pump 129 (e.g., recirculation pump) pressurizes and supplies the combined draw stream 130 at a selected hydrostatic pressure and flow rate. The combined draw stream 130 then enters the first membrane stage 106 where permeate(s) are drawn from the combined feed stream 105 into the combined draw stream 130. The combined draw stream 130 absorbs a portion of the total permeate (e.g., the largest single portion) in the system 100. The combined draw stream having the absorbed permeate(s) is discharged from first membrane stage 106 to form the (third) recirculated draw stream 128. The third recirculated draw stream 128 is the most dilute stream in the system 100. At least a portion of the third recirculated draw stream 128 is forced out of the first stage draw recirculation loop to form the diluted draw discharge stream 131 of the system 100. At least a portion of the third recirculated draw stream 128 may be directed back to the first membrane stage 106. For example, the a portion of the third recirculated draw stream 128 and the third draw stream 127 may be combined prior to the hydrostatic pressure controlled pump 129. A valve may be positioned between the third recirculated draw stream 128 and the pump 129 to selectively control an amount of the third recirculated draw stream 128 that is passed to the pump 129 or to the diluted draw discharge stream 131 (e.g., fully diluted draw stream).

The valves and pumps disclosed in the system 100 may be electronically controlled, such as from a controller (e.g., computer having programming for selectively opening and closing valves and adjusting flow rates and hydrostatic pressures). For example, a controller may selectively actuate the valves and pumps to maintain or achieve one or more of selected flow rates, concentrations of solutes or permeates, or hydrostatic pressures in various portions of the system 100. In some examples, valves may be actuated to at least partially open or close recirculation loops to mix or move the recirculated feed or draw streams throughout the system 100. In some examples, the pumps (e.g., hydrostatic pressure controlled pumps and flow controlled pumps) may be adjusted to provide selected flow rates and hydrostatic pressures in the various membrane stages 106, 111, and 116. If the selected solution flow rate in the feed and/or draw stream of a membrane module (e.g., stage) of the system is greater than the system is currently producing, the feed and/or draw recirculation pump speeds can be increased, increasing the flow rate to the selected level. As the flow rate on the recirculation pump (e.g., hydrostatic pressure controlled pump 129, 104, 125, 109, etc.) is increased, the feed and draw inlet flow rates are maintained. Therefore, additional flow from the outlet of each stage is recirculated back to the inlet of that stage. The flow of feed solution to the next stage is equal to the feed solution inlet flow rate minus the flow of water across the membrane in the previous stage and may or may not change depending on the application. The flow of draw solution to the next stage is equal to the draw solution inlet flow rate plus the flow of water across the membrane in the previous stage and may or may not change depending on the application.

In some examples, if there is a desired membrane stage inlet hydrostatic pressure, the feed and draw inlet pumps (e.g., flow controlled pump 101 or 118) may run at a constant speed and the feed and/or draw recirculation pumps (e.g., hydrostatic pressure controlled pump 129, 104, 125, 109, etc.) may increase or decrease speed to maintain a hydrostatic pressure set point at the inlet of each membrane stage, for example 55 kPa to 138 kPa. As the recirculation pumps increase speed, increased flow is recirculated and there is increased flow through the membrane(s) which increases pressure drop from the inlet to the outlet of the membrane(s). The recirculation pump is adjusted to the correct speed to maintain the desired pressure drop through the membrane module (e.g., from inlet to outlet).

In some examples, if there is a desired recirculation proportion (e.g., amount of concentrated feed or diluted draw selected for recirculation), the feed and draw inlet pumps run at a given flow rate and the feed and/or draw recirculation pumps at each membrane stage run at a selected proportion to the membrane stage inlet flow rate. As the membrane stage flow rate increases or decreases, the recirculation pumps may be adjusted to the selected speed to maintain the desired flow proportion, for example at least a 20% increase of one or more of the feed or draw stream flow rate (e.g., speed), such as 20% to at least 10,000%, 20% to 100%, 100% to 500%, 500% to 1,000%, 1,000% to 5,000%, 5,000% to 10,000%, at least 100%, at least 500%, at least 10,000%, less than 10,000%, or less than 1,000% increase of one or more of the feed or draw stream flow rate in the membrane stage(s).

By having a common inlet and outlet header on the feed and draw solution recirculation loops, for the plurality of the membrane stages, the membrane stages may be effectively purged of gas, and drained of liquid. The valves may be selectively opened and closed to purge gases from the system 100 and the individual membrane stages therein during a startup procedure when system 100 is first filled with liquid, or during steady state operation when a gas is coming out of solution and accumulating in the recirculation loop, for example when concentrating a carbonate beverage. In addition, the recirculation loops allow for a decrease in the membrane path length per stage, for example, decreasing the membrane path length from 20 meters to 2 meters, aiding in purging gas and draining liquid. In typical osmotic systems, removal of gas from the liquid system is difficult, and so systems are often operated in a bulk co-current "up-flow" direction where both feed stream and draw stream flow directions rise and the only high-points are at the feed and draw outlets. In the systems disclosed herein, the membranes modules can be operated in a bulk counter-current flow configuration, as described above, which is more efficient for osmotic systems than bulk co-current flow. Because of this bulk counter-current flow operation and the use of recirculation on the feed and draw solutions, there are multiple high-points in the system 100. In the system 100, the plumbing (e.g., piping) may be laid out such that feed and draw outlet pipes are the highest points on the system, above the membrane stages as shown in FIG. 1, and valves may be included at each high point that can be intermittently operated, either manually or automatically, either with or without measuring gas accumulation, to vent any accumulated gas to the outlet of the system 100. The valves provide high point vents for filling, draining, cleaning, and otherwise operating the system 100.

Due to the shortened membrane path length noted above, the recirculation configurations disclosed herein are suitable for a variety of membrane packaging methods, including spiral wound membrane modules, hollow fiber membrane modules, plate and frame membrane modules, flat sheet membrane modules, and other membrane packaging methods. This is particularly beneficial in recovering a feed solution that is of great value.

Due to the significantly shorter resonance time per membrane stage (due to the shorter membrane path length or higher flow rate), and the opportunity for recirculated solutions to be mixed back together after a single pass through a stage, the recirculated feed and draw stream configurations allow for multiple membranes or membrane modules to be configured in parallel within a single stage of the system 100 without the need for active flow division. The systems disclosed herein are much more tolerant to subtle variations in flow rates across multiple parallel membranes within a single stage than conventional systems that do not have the recirculation loops. For example, ten membranes could be configured in parallel, all receiving feed flow in parallel from one feed recirculation pump, and all receiving draw flow in parallel from one draw recirculation pump. Small variations in feed stream and draw stream flow rate, about 20% or less, would result in negligible performance variations due to a shortened resonance time within the membrane stage.

While described as streams referring to a fluid solution, it should be understood the feed streams, draw streams, combined draw streams, recirculated streams, and other streams disclosed herein also refers to the fluid connections (e.g., plumbing such as pipes, conduits, tubes, etc.) containing said streams as shown in FIG. 1.

While depicted as having three membrane stages, fluid separation systems may include at least two membrane stages, such as 2 to 100 stages, 2 to 20 stages, 2 to 5 stages, 3 stages to 6 stages, 5 to 10 stages, 10 to 15 stages, or 15 to 20 stages, or less than 20 stages. Each stage has a respective draw and recirculation loop as disclosed herein with respect to FIG. 1, is connected to a previous and/or subsequent stage as described above with respect to FIG. 1, and may be operated as disclosed herein. The separate feed recirculation loops maintain the efficiency of the system, and the number of membrane stages is balanced to maintain a selected membrane efficiency, for example greater than 50%, 60%, 70%, 80%, or 90% of the maximum membrane performance, and minimize equipment. Each stage may or may not be the same size, depending on the specific application. In such a system, the flow rate of the feed stream through the membrane module can be at least 0.1 times or at least 100 times more (e.g., 0.1 to 1000 times more, 0.1 to 2 times more, 2 to 10 times more, 10 to 20 times more, 20 to 40 times more, 40 to 60 times more, 60 to 100 times more, or less than 100 times more) than the feed inlet flow rate to the overall system. The recirculated feed flow rate returned to the membrane stage by recirculation may be controlled either by maintaining a target proportion of flow of feed solution into and out of the recirculation loops, maintaining a target flow rate through the membrane, or maintaining a target hydrostatic pressure at the inlet and outlet of the membrane stage. In this way, the maximum recirculation allowable on a specific membrane stage can be maintained even as conditions or solutions (e.g., concentrations or species) change. This feed stream recirculation allows increased flow through the feed channel compared to typical systems that do not have feed stream recirculation loops, increasing membrane surface velocity of the feed stream across the membrane with respect to the typical systems. This feed recirculation also allows flexible operation of the membrane system because feed solutions of varying concentration can be treated on the same system simply by increasing or reducing the recirculation flow rate. In addition, a feed stream flow rate may be achieved with a velocity high enough to keep suspended solids in suspension in the feed stream in at least some of the membrane stages.

Separate draw recirculation loops also maintain the efficiency of the system, and the number of stages is balanced to maintain sufficient membrane efficiency, for example greater than 50%, 60%, 70%, 80%, or 90% of the maximum membrane performance, and minimize equipment. Each stage may or may not be the same size, depending on the specific application. In such a system, the flow rate through the membrane element may be at least 0.1 times or at least 100 times more (e.g., 0.1 to 1000 times more, 0.1 to 2 times more, 2 to 10 times more, 10 to 20 times more, 20 to 40 times more, 40 to 60 times more, 60 to 100 times more, or less than 100 times more) than the draw inlet flow rate to the overall system. The recirculated draw flow rate returned to the membrane stage by recirculation can be controlled either by maintaining a target proportion of flow of draw solution into and out of the recirculation loops, maintaining a target flow rate through the membrane, or maintaining a target hydrostatic pressure at the inlet and outlet of the membrane stage. In this way, the maximum recirculation allowable on a specific membrane stage can be maintained even as conditions or solutions change. This recirculation allows increased draw flow through the draw channel compared to typical systems that do not have draw recirculation loops, increasing membrane surface velocity with respect to the typical systems. This draw recirculation also allows flexible operation of the membrane system because feed solutions of varying concentration can be treated on the same system simply by increasing or reducing the recirculation flow rate in at least some of the membrane stages.

Each membrane stage (e.g., osmosis module) may be operated in a co-current flow or manner, where the feed and the draw enter the membrane stage at respective inlets, travel through the membrane stage in the same direction, and exit the membrane stage at respective outlets. This co-current flow allows the feed and draw hydrostatic pressures to drop together due to head loss as water is transferred across the membrane stage. This is the opposite effect achieved in a counter-flow membrane stage. By controlling the feed and draw recirculation flow rates based on hydrostatic pressure, the inlet hydrostatic pressure of the feed may be controlled at a desired hydrostatic pressure differential with respect to the draw inlet hydrostatic pressure, for example at least greater than 0 kPa (e.g., greater than 0 kPa to 689 kPa, greater than 0 kPa to 13.5 kPa, 6.9 kPa to 35 kPa, 13.5 kPa to 69 kPa, 69 kPa to 689 kPa, or less than 35 kPa) greater than the draw inlet hydrostatic pressure, allowing for uniform and low differential hydrostatic pressure between the feed and draw solutions. This allows for a greater retention of components in the feed and draw solution than in conventional fluid separation systems operating in counter-current flows.

The recirculation loop at each stage of the feed stream and draw stream allows each membrane module to be operated at selected flow rates and hydrostatic pressures, while making significant changes to the bulk feed and bulk draw flow rates. This allows one fluid separation system (having the membrane modules and corresponding recirculation loops disclosed herein) to efficiently handle a variety of operational requirements, for example 1.2 times to 20 times (e.g., 1.2 times to 5 times, 5 times to 10 times, or 10 times to 20 times) concentration of a feed solution. The multi-stage recirculation configurations disclosed herein allow for higher feed and draw flow rates per element, thus higher surface speeds and better membrane performance than a conventional series of osmotically driven membrane modules without the recirculation configurations disclosed herein. This benefit is twofold. First, the feed stream and draw stream flow rate(s) to an individual membrane module (at a selected stage) are greater than the bulk input to that stage of the system, in some examples at least 50% greater, such as 50% to 5,000% greater, 50% to 200% greater, 200% to 500% greater, 500% to 1,000% greater, 1,000% to 5,000%, less than 5,000% greater, less than 2,000% greater, or less than 1,000% greater, or less than 500% greater. The greater flow rate allows for much higher surface speed of the feed stream and draw stream across the membrane compared to a system with no recirculation. Second, a selected hydrostatic pressure drop from inlet of membrane to outlet of membrane for each stage can be controlled (e.g., about 138 kPa) as may be dictated by equipment hydrostatic pressure limits, energy use, or other process parameters at each stage, versus collectively over the entire process (e.g., group of stages).

Figure 4:
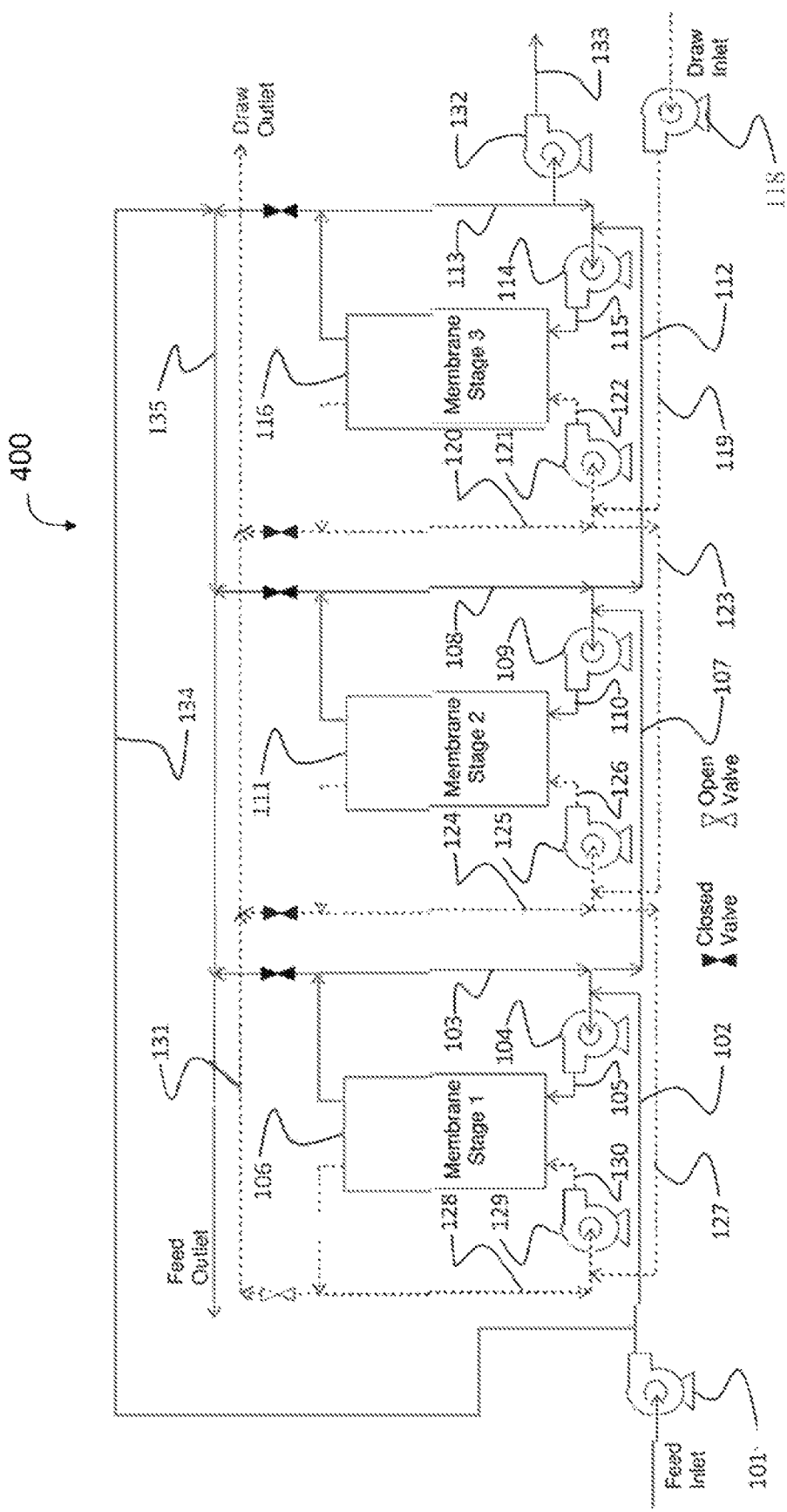
FIG. 4 is a schematic of a system 400 for separating components of a solution, according to an embodiment.

FIG. 4 is a schematic of a modified plumbing configuration of a system 400 for separating components of a solution. Components of system 100 are used in system 400, as shown. The system 400 includes a flow controlled pump 132 operably coupled to the third stage recirculated feed stream 113 to produce the flow controlled concentrated discharge stream 133. The flow controlled concentrated discharge stream 133 may be similar or identical to the concentrated feed discharge stream 117 of FIG. 1 in one or more aspects such as concentration of solute(s). The flow controlled concentrated feed discharge stream 133 is removed from the third (e.g., final) recirculated feed stream 113 by the flow controlled pump 132 (e.g., concentrated feed discharge pump). The flow rate of the flow controlled pump 132 may be selectively controlled to achieve a target feed concentration factor and weight percent of solute(s), and may increase the ability to control the concentration factor of the system, particularly at concentration factors greater than three. By controlling the flow rate out of the flow controlled pump 132, the feed into the system 400 is controlled in least in part by the sum the flow rate of the concentrated discharge stream 133 and the total permeate removed from the bulk feed stream 102 in the system.

The system 400 also includes feed slip stream 134, which is connected to the third (e.g., final) recirculated feed stream via a valve (shown as closed). The feed slip stream is also operably coupled to the feed discharge header which is operably coupled to each of the feed recirculation loops. In some examples, the flow controlled pump 101 provides an oversupply feed solution, a portion of this flow becoming the bulk feed stream 102, for example 10 to 90 percent, and a portion of this flow becoming the feed slip stream 134, for example 10 to 90 percent. The feed slip stream 134 may be used to carry away and remove gas that is released from the various feed stages during startup and during steady state operation, such as via the feed discharge header 135. In such cases, concentrated feed discharge stream 133 is the product of the system 400, and the slip stream 134 is connected to the feed discharge header where it may be returned to a feed source tank.

This systems disclosed herein have the advantages of more efficient osmotic operation due to reduced boundary layers, reduced membrane spacer fueling, improved solids suspension, and improved cleanability of the membranes over typical systems that do not contain the recirculation loops disclosed herein.

While described as a system, it should be understood that a process for separating a fluid can be accomplished utilizing FIG. 1 as a flow diagram of the process. For example, a method of separating a fluid may be used to concentrate a feed stream to a selected amount with the system 100. For example, a feed stream at 10 wt % (weight percentage of dissolved solids in total solution) may be concentrated by 5 times or more. In some examples, the concentration factor of the liquid separation processes disclosed herein may be as low as 1.1 times an original concentration or wt % or as high as at least 50 times the original concentration or wt %, such as 1.1 times to 5 times, 5 times to 10 times, 10 times to 20 times, 20 times to 50 times the original concentration or wt % of dissolved solids in solution. In some examples, the initial feed stream may be as low as at least 1 wt % or as great as at least 99 wt %. In some examples, the concentrated feed stream may be as low as at least 1 wt % or as great as at least 99 wt %.

Figure 2:
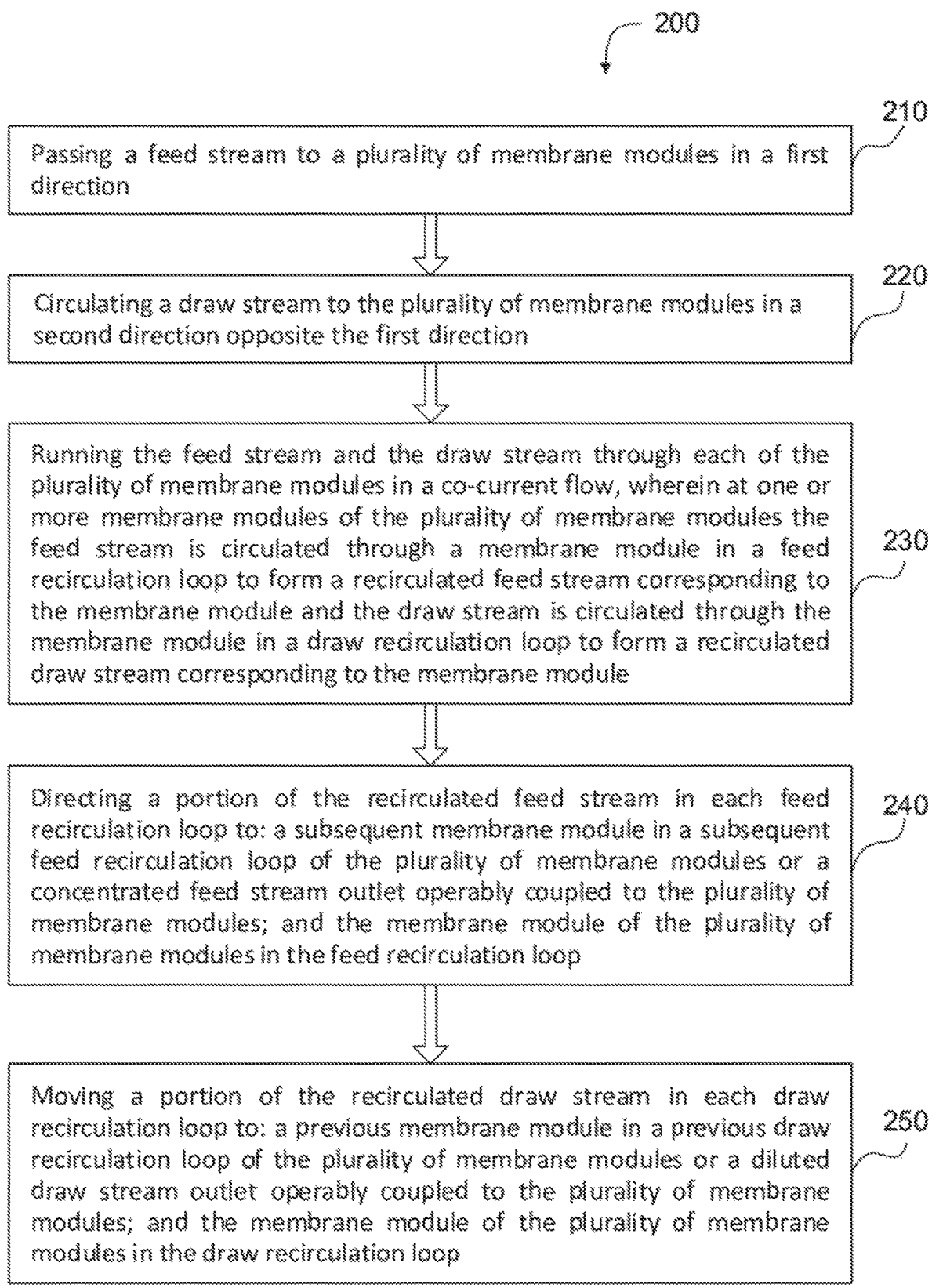
FIG. 2 is a flow chart of a method 200 for separating components from a solution, according to an embodiment.

FIG. 2 is a flow chart of a method 200 for separating components from a solution, according to an embodiment. The method 200 includes an act 210 of passing a feed stream to a plurality of membrane modules in a first direction; an act 220 of circulating a draw stream to the plurality of membrane modules in a second direction opposite the first direction; an act 230 of running the feed stream and the draw stream through each of the plurality of membrane modules in a co-current flow, wherein at one or more membrane modules of the plurality of membrane modules the feed stream is circulated through a membrane module in a feed recirculation loop to form a recirculated feed stream corresponding the membrane module and the draw stream is circulated through the membrane module in a draw recirculation loop to form a recirculated draw stream corresponding to the membrane module; an act 240 of directing a portion of the recirculated feed stream in each feed recirculation loop to: a subsequent membrane module in a subsequent recirculated feed loop of the plurality of membrane modules or a concentrated feed stream outlet operably coupled to the plurality of membrane modules and the membrane module of the plurality of membrane modules in the feed recirculation loop; and an act 250 of moving a portion of the recirculated draw stream in each draw recirculation loop to: a previous membrane module in a previous draw recirculation loop of the plurality of membrane modules or a diluted draw stream outlet operably coupled to the plurality of membrane modules; and the membrane module of the plurality of membrane modules in the draw recirculation loop. In some examples, the acts 210-250 may be performed in different orders than presented, at least some of the acts 210-250 may be omitted, or additional acts may be performed in carrying out the method 200.

The act 210 of passing a feed stream to a plurality of membrane modules in a first direction may include any of the aspects directing a bulk feed stream through a plurality of membrane modules as shown and described with respect to FIG. 1. For example, the plurality of membrane modules may include any of the membrane modules or systems or components thereof disclosed herein. For example, the plurality of membrane modules may be arranged in series from a first membrane module to a last membrane module. Such membrane modules may include any of the feed recirculation loops and draw recirculation loops disclosed herein. In some examples, passing a feed stream to a plurality of membrane modules in a first direction may include supplying the feed stream to a first membrane module of the plurality of membrane modules. The feed stream may be a bulk feed stream supplied from a pump at a first feed stream hydrostatic pressure and/or flow rate.

The act 220 of circulating a draw stream to the plurality of membrane modules in a second direction opposite the first direction may include any of the aspects circulating a bulk draw stream through a plurality of membrane modules as shown and described with respect to FIG. 1. For example, circulating a draw stream to the plurality of membrane modules in a second direction opposite the first direction may include supplying the draw stream to a last membrane module of the plurality of membrane modules. The bulk draw stream may be provided from a pump, at a first draw stream hydrostatic pressure and flow rate.

The act 230 of running the feed stream and the draw stream through each of the plurality of membrane modules in a co-current flow, wherein at one or more membrane modules of the plurality of membrane modules the feed stream is circulated through a membrane module in a feed recirculation loop to form a recirculated feed stream corresponding the membrane module and the draw stream is circulated through the membrane module in a draw recirculation loop to form a recirculated draw stream corresponding to the membrane module may include circulating the feed stream and draw stream through a membrane unit as described with respect to FIG. 1, in one or more aspects. For example, running the feed stream and the draw stream through each of the plurality of membrane modules in a co-current flow may include pumping the feed stream and the draw stream through hydrostatic pressure controlled pumps in the feed recirculation loop and the draw recirculation loop into the feed side and the draw side at one or more of selected hydrostatic pressures and flow rates, respectively. In some examples, the selected hydrostatic pressures may include a greater hydrostatic pressure on the feed side than the draw side, such as to prevent leakage of draw solution into the feed solution through any imperfections (e.g., pinhole leaks or tears) in the forward osmosis membrane.

In some examples, running the feed stream and the draw stream through each of the plurality of membrane modules in a co-current flow may include combining the feed stream with a portion of the recirculated feed stream and combining the draw stream with a portion of the recirculated draw stream. In some examples, combining the feed stream with a portion of the recirculated feed stream and combining the draw stream with a portion of the recirculated draw stream is carried out before running the feed stream and the draw stream through each of the plurality of membrane modules.

The act 240 of directing a portion of the recirculated feed stream in each feed recirculation loop to: a subsequent membrane module in a subsequent feed recirculation loop of the plurality of membrane modules or a concentrated feed stream outlet operably coupled to the plurality of membrane modules; and the membrane module of the plurality of membrane modules in the feed recirculation loop may include directing portions of the recirculated feed stream in a recirculation loop to both the subsequent feed recirculation loop and the membrane module in proportions calculated to provide a selected flow rate, hydrostatic pressure, and concentration to the respective stream in the respective recirculation loop or subsequent membrane module. In some examples, directing a portion of the recirculated feed stream in each feed recirculation loop to a subsequent membrane module in a subsequent feed recirculation loop of the plurality of membrane modules or a concentrated feed stream outlet operably coupled to the plurality of membrane modules may include outputting the concentrated feed stream from a feed outlet of a system including the plurality of membrane modules. Such output may be to a storage vessel or to a delivery apparatus such as a truck or pipeline.

The act 250 of moving a portion of the recirculated draw stream in each draw recirculation loop to: a previous membrane module in a previous draw recirculation loop of the plurality of membrane modules or a diluted draw stream outlet operably coupled to the plurality of membrane modules; and the membrane module of the plurality of membrane modules in the draw recirculation loop may include moving portions of the recirculated draw stream to both the subsequent draw recirculation loop and the membrane module in proportions calculated to provide a selected flow rate, hydrostatic pressure, and concentration to the respective stream in the respective recirculation loop or subsequent membrane module. In some examples, moving a portion of the recirculated draw stream in each draw recirculation loop to a previous membrane module in a previous draw recirculation loop of the plurality of membrane modules or a diluted draw stream outlet operably coupled to the plurality of membrane modules may include outputting the diluted draw stream from a diluted draw stream outlet of a system included the plurality of membrane modules. Such output may be to a storage vessel, a recycling apparatus (e.g., to a system including one or more reverse osmosis modules or distillation apparatuses) to reconcentrate the draw stream, or to a truck or pipeline.

The method 200 may include selectively controlling amount of one or more of the recirculated feed stream or recirculated draw stream that is recirculated to the corresponding membrane modules or that is passed on to a subsequent or previous membrane modules as a feed stream or draw stream in acts 240 and 250. Such selective control can include selective actuation of valves to cause a an amount of the recirculated feed stream and recirculated draw stream calculated to provide a selected concentration of dissolved solids, permeate, or solute; provide a selected hydrostatic pressure; or provide a selected flow rate to recirculate or pass to the next membrane module. Such control may be manually controlled or automatically controlled based on sensing information from sensors providing data regarding concentrate of dissolved solids, permeate, or solute; a hydrostatic pressure; or a flow rate in one or more portions of the system. Further selective control may include selective control of one or more valves or pumps in the system (FIG. 1) based on any of the criteria noted above.

The method 200 may include further acts such as any of the acts disclosed herein. In an example, the method 200 may include venting gas from at least one of the feed recirculation loop or draw recirculation loop corresponding to one or more of the plurality of membrane modules. Such venting may be carried out by manipulation of one or more valves as disclosed herein. In some examples, an osmotic system may operate recirculating feed and draw solutions in each of a plurality of stages (e.g., membrane modules and corresponding draw and feed recirculation loops) with valves on each high-point that connect to the solution outlets. This system provides efficient gas removal from the system and reduces wasting of solutions as any entrained gas is vented. If gas has accumulated in the high point of the recirculation loop as measured by a liquid level switch or float therein, the valve(s) can be opened for a short time allowing the gas to pass into the appropriate feed or draw outlet pipe. Once the gas is vented to the outlet pipe, the valve(s) can be closed. Any liquid that may pass with the gas through the valve(s) is captured into the feed or draw outlet stream and not lost. The gas venting valve(s)s can be opened for a short time intermittently based on pre-programmed durations allowing the gas to pass into the appropriate feed or draw outlet pipe. After the pre-programmed duration, the valve(s) can be closed. The gas venting valve(s) can be manually opened for a short time intermittently based on observation allowing the gas to pass into the appropriate feed or draw outlet pipe. After the venting, the valve(s) can be closed. Any liquid that may pass with the gas through the valve(s) is captured into the feed or draw outlet stream and not lost.

The systems and processes disclosed herein can be used to provide efficient, uninterrupted, and selectively controllable removal of permeates from a feed stream. An example process using the system of FIG. 1 is described below.

PARTICULAR EXAMPLE

A bulk feed stream at 10 wt % (weight percentage of dissolved solids in total solution) is circulated through a membrane module system having recirculation loops as shown in FIG. 1. A raw feed stream at 10 wt % is pumped with flow controlled pump 101 to form a bulk feed stream 102 at a feed bulk flow rate of 125 L/h at about 34.5 kPa. Bulk feed stream 102 is fed into a first membrane stage feed recirculation loop and mixed with a partially concentrated and recirculated feed stream 103 at 15.6 wt %, and pumped with a hydrostatic pressure controlled pump 104 to form combined feed stream 105 at 15.1 wt %, 1375 L/h, and 124 kPa. The combined feed stream 105 then enters the first membrane stage 106. The combined feed stream 105 loses 45 L/h, 45% of the total permeate removed in the system 100, and is discharged from first membrane stage 106, forming recirculated stream 103 at 15.63 wt %, 1330 L/h, and 34.5 kPa. A portion of combined feed stream is forced out of the first stage feed recirculation loop in recirculated feed stream 103 to form the second feed stream 107 at 15.63 wt %, 80 L/h, and 34.5 kPa.

Second feed stream 107 is fed into the second stage feed recirculation loop and mixed with (partially concentrated and) recirculated feed stream 108 at 27.8 wt %, and pumped with hydrostatic pressure controlled pump 109 to form second combined feed stream 110 at 26.7 wt %, 880 L/h, and 124 kPa. The second combined feed stream 110 then enters the second membrane stage 111. The second combined feed stream 110 loses 35 L/h, 35% of the total permeate removed in the system, and is discharged from the second membrane stage 111, to form recirculated feed stream 108 at 27.8 wt %, 845 L/h, and 34.5 kPa. A portion of the recirculated feed stream 108 is forced out of the second stage feed recirculation loop forming third feed stream 112 at 27.8 wt %, 45 L/h, and 34.5 kPa.

Third feed stream 112 is fed into the third stage feed recirculation loop and mixed with a fully concentrated and recirculated feed stream 113 at 50.0 wt %, and pumped with hydrostatic pressure controlled pump 114 forming combined feed stream 115 at 48.0 wt %, 495 L/h, and 124 kPa. The combined feed stream 115 then enters the third membrane stage 116. The feed stream loses 20 L/h, 20% of the total permeate removed in the system 100, and is discharged from the third membrane stage 116 to form recirculated feed stream 113 at 50.0 wt %, 475 L/h, and 34.5 kPa. A portion of recirculated feed stream 113 is forced out of the third stage feed recirculation loop forming the concentrated feed discharge stream 117 at 50.0 wt %, 25 L/h, and 34.5 kPa.

A draw solution at 84 wt % is pumped with flow controlled pump 118 to form bulk draw stream 119 at a draw bulk flow rate of 54 L/h at 20.5 kPa. Bulk draw stream 119 is fed into the third stage draw recirculation loop and mixed with a partially diluted and recirculated draw stream 120 at 61.3 wt %, and pumped with hydrostatic pressure controlled pump 121 to form combined draw stream 122 at 63.3 wt %, 592 L/h, and 110 kPa. The combined draw stream 122 then enters the third membrane stage 116. The combined draw stream 122 absorbs 20 L/h, 20% of the total permeate in the system 100, and is discharged from the third membrane stage 116 to form recirculated draw stream 120 at 61.3 wt %, 612 L/h, and 20.5 kPa. A portion of recirculated draw stream 120 is forced out of the third stage draw recirculation loop forming draw stream 123 at 61.3 wt %, 74 L/h, and 20.5 kPa.

Draw stream 123 is fed into the second stage draw recirculation loop and mixed with (partially diluted and) recirculated draw stream 124 at 41.6 wt %, and pumped with hydrostatic pressure controlled pump 125 to form combined draw stream 126 at 43.4 wt %, 812 L/h, and 110 kPa. The combined draw stream 126 then enters the second membrane stage 111. The combined draw stream 126 absorbs 35 L/h, 35% of the total permeate in the system 100, and is discharged from the second membrane stage 111 to forming recirculated draw stream 124 at 41.6 wt %, 847 L/h, and 20.5 kPa. A portion of recirculated draw stream 124 is forced out of the second stage draw recirculation loop forming third draw stream 127 at 41.6 wt %, 109 L/h, and 20.5 kPa.

The third draw stream 127 is fed into the first stage draw recirculation loop and mixed with (partially diluted and) recirculated draw stream 128 at 29.4 wt %, and pumped with hydrostatic pressure controlled pump 129 forming combined draw stream 130 at 30.5 wt %, 1197 L/h, and 110 kPa. The combined draw stream 130 then enters the first membrane stage 106. The combined draw stream 130 absorbs 45 L/h, 45% of the total permeate in the system, and is discharged from the first membrane stage 106 to form recirculated draw stream 128 at 29.4 wt %, 1242 L/h, and 20.5 kPa. A portion of recirculated draw stream 128 is forced out of the first stage draw recirculation loop forming the diluted draw discharge stream 131 at 29.4 wt %, 153.9 L/h, and 20.5 kPa.

One unexpected outcome of examples of recirculation configurations disclosed herein (e.g., recirculation loops), is the increase in membrane efficiency which may be achieved over systems without the feed and draw recirculation loops due to increased surface speeds of the feed and draw streams compared to systems that do not include the recirculation loops disclosed herein. In the particular example, a feed stream at 10 wt % is concentrated by five times. In contrast to the systems disclosed herein, performing this process without techniques described herein in a single pass forward osmosis membrane system, a concentrated draw solution of 84 wt % was required for the feed solution to reach a final concentration 50 wt %. This results in a final concentration difference of 34 wt %. With the recirculation configurations disclosed herein, the bulk draw stream 119 at a concentration of 84 wt % may be fed into the third stage draw recirculation loop and mixed with a partially diluted and recirculated draw stream 120 at 61.3 wt %, and pumped with a hydrostatic pressure controlled pump 121 forming a combined draw stream 122 at 63.3 wt %. The combined draw stream 122 absorbs 20 L/h, 20% of the total permeate in the system, and is discharged from the third membrane stage 116 to form draw stream 120 at 61.3 wt %. This results in a final concentration difference of 11.3 wt %, which is about one third of the driving force applied in the conventional, single pass forward osmosis membrane system. This shows examples of recirculation configurations disclosed herein may unexpectedly result in membrane efficiency that is about three times greater than the single pass forward osmosis membrane systems which do not employ the techniques described herein. The penalty for mixing a concentrated draw solution into the third stage draw recirculation loop may be fully compensated by the increase in membrane efficiency in some examples.

Figure 3:
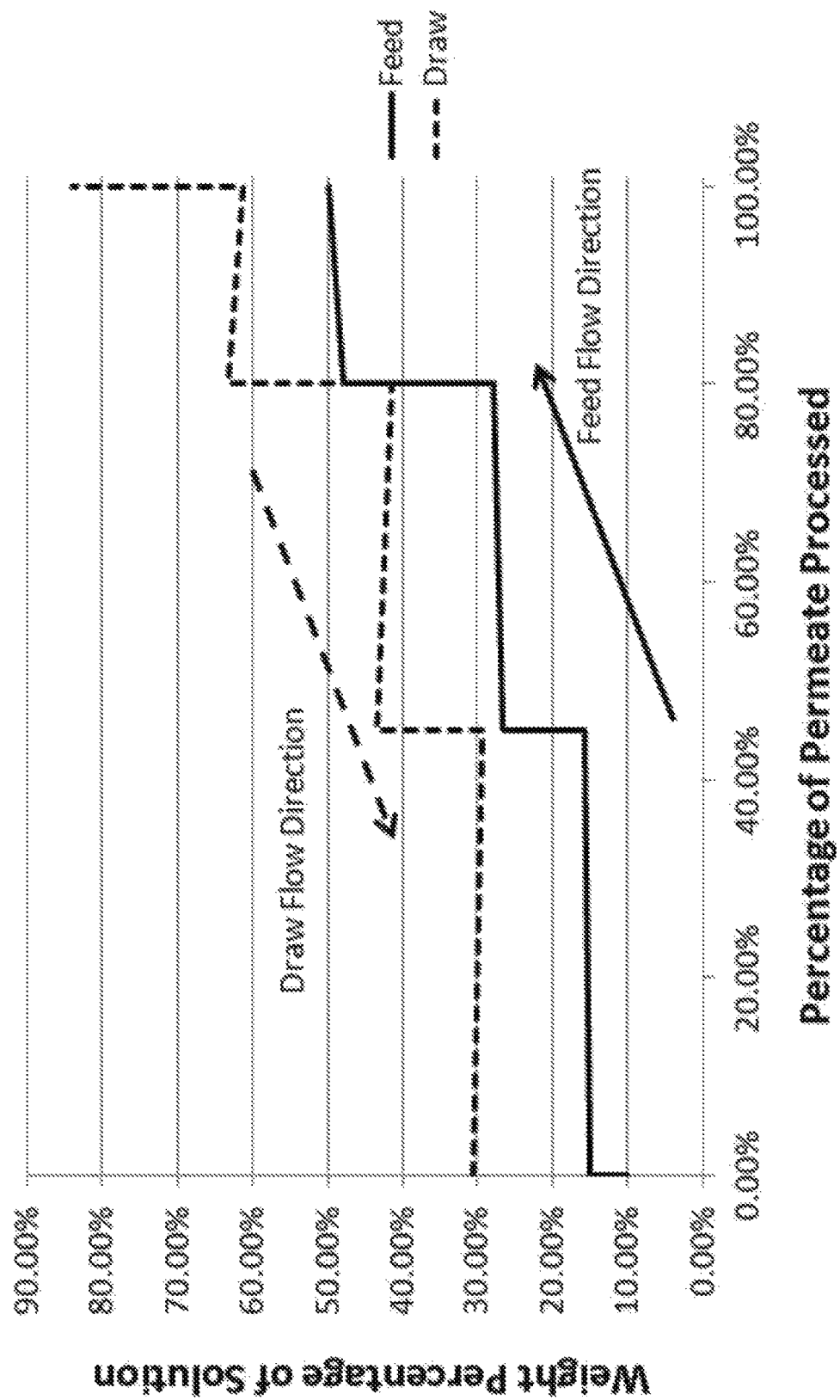
FIG. 3 is a graph of the weight percentage of solute of the feed solution and draw solution as a function of the percentage of the permeate processed according to a particular example.

FIG. 3 is a graph of the weight percentage of solute of the feed solution and draw solution as a function of the percentage of the permeate processed according to the particular example described above. In this example, the solute(s) in the feed solution and the solute(s) in the draw solution have the same osmotic pressure per weight percent (although in other examples these osmotic pressures may differ per weight percent). As shown, the counter-current bulk flow does not impede the ability of the draw stream at each stage to remove permeate from the feed stream despite the concentration of draw solute in the bulk draw stream steadily decreasing throughout the process. Notably, the difference in concentration (weight percentage of permeate in solution) difference between the draw stream and feed stream at each membrane stage—visible as corresponding steps—remains at about 15 wt % or less throughout the entire process. This is the opposite of a co-current flow, which utilizes a very large difference between the bulk feed stream and the initial bulk draw stream to account for decreased solute concentration in the draw stream as the feed stream is steadily diluted. Accordingly, examples of the configurations disclosed herein may be more chemically and energy efficient than conventional configurations.

As used herein, the term "about" or "substantially" refers to an allowable variance of the term modified by "about" by +10% or +5%. Further, the terms "less than," "or less," "greater than", "more than," or "or more" include as an endpoint, the value that is modified by the terms "less than," "or less," "greater than," "more than," or "or more."

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A system for separating a fluid, the system comprising:
   a plurality of osmosis modules operably coupled together, the plurality of osmosis modules including a first osmosis module and a final osmosis module, at least some of the plurality of osmosis modules including:
an osmosis membrane;
a feed side on a first side of the osmosis membrane;
a draw side on a second side of the osmosis membrane;
a feed inlet operably coupled to the feed side;
a draw inlet operably coupled to the draw side;
a feed outlet operably coupled to the feed side;
a draw outlet operably coupled to the draw side;
a feed recirculation loop operably coupled to the feed inlet, the feed outlet, and a feed inlet of a downstream osmosis module relative to the feed recirculation loop;
a draw recirculation loop operably coupled to the draw inlet, the draw outlet, and a draw inlet of a downstream osmosis module relative to the draw recirculation loop;
one or more first valves operably coupled to the feed recirculation loop; and
one or more second valves operably coupled to the draw recirculation loop,
wherein the one or more first valves and the one or more second valves are disposed above the feed recirculation loop and the draw recirculation loop,
wherein each osmosis module is configured to operate in a co-current flow such that a feed stream and a draw stream are configured to:
enter the osmosis module at the feed inlet and the draw inlet, respectively;
travel through the osmosis module in a same direction; and
exit the osmosis module at the feed outlet and the draw outlet, respectively; and
wherein a bulk feed stream flows from the first osmosis module to the final osmosis module, and a bulk draw stream flows from the final osmosis module to the first osmosis module.

2. The system of claim 1, further comprising a feed recirculation pump in the feed recirculation loop and a draw recirculation pump in the draw recirculation loop of each osmosis module of the plurality of osmosis modules, the feed recirculation pump being operably coupled to a feed stream source and the draw recirculation pump being operably coupled to a draw stream source.

3. The system of claim 2, wherein the feed stream source includes a previous osmosis module feed recirculation loop or a bulk feed stream inlet of the osmosis system, and the draw stream source includes a subsequent osmosis module draw recirculation loop or a bulk draw stream inlet of the osmosis system.

4. The system of claim 2, wherein the feed stream source includes a pump supplying the bulk feed stream, and the draw stream source includes a pump supplying the bulk draw stream.

5. The system of claim 1, wherein the one or more first valves are operably coupled to a feed outlet of the osmosis system above the plurality of osmosis modules, and wherein the one or more second valves are operably coupled to a draw outlet of the osmosis system above the plurality of osmosis modules.

6. The system of claim 5, wherein the one or more first valves and the one or more second valves are actuatable to selectively remove fluid or gas from the feed recirculation loop and the draw recirculation loop.

7. The system of claim 1, wherein the at least one of the plurality of osmosis modules includes a forward osmosis module.

8. The system of claim 1, wherein the one or more first valves and the one or more second valves are gas valves.

9. The system of claim 4, wherein the bulk feed stream is fed into the feed recirculation loop and mixed with the recirculated feed stream to form a combined feed stream prior to introduction into the first osmosis module, and wherein the feed recirculation pump is configured to pump the combined feed stream at a selected hydrostatic pressure and flow rate.

10. The system of claim 4, wherein the bulk draw stream is combined with a portion of the recirculated draw stream prior to introduction into the final osmosis module to form a combined draw stream, and wherein the draw recirculation pump is configured to pump the combined draw stream into first osmosis module at a selected hydrostatic pressure and flow rate.

* * * * *